Feb. 5, 1963  P. J. BROWNSCOMBE  3,076,377
OPTICAL PROJECTOR SYSTEM
Filed Oct. 6, 1958

SHADOW CAST BY BULB OF LAMP ENVELOPE

ILLUMINATION CONE OF CONDENSER 25 BRIGHTENS CENTRAL SHADOWED REGION

REGION OF INCREASED ILLUMINATION

SCREENED REGIONS OF REDUCED ILLUMINATION

REGION OF INCREASED ILLUMINATION

INVENTOR:—
PHILIP J. BROWNSCOMBE
BY:—
Marzall, Johnston, Cook & Root
ATTORNEYS

United States Patent Office 3,076,377
Patented Feb. 5, 1963

3,076,377
OPTICAL PROJECTOR SYSTEM
Philip J. Brownscombe, Chatham, N.J., assignor to Eugene Dietzgen Co., Chicago, Ill., a corporation of Delaware
Filed Oct. 6, 1958, Ser. No. 765,667
10 Claims. (Cl. 88—24)

The present invention relates in general to optics, and has more particular reference to projection printing apparatus especially adapted for making enlarged microfilm projection prints.

Microfilm prints are now made by projecting an enlarged image of the microfilm transparency upon a photosensitive sheet, in a darkroom, and by then developing fixing, washing and drying the resulting print, in accordance with conventional photographic procedures requiring the services of a photo technician, as well as relatively expensive darkroom and other equipment not normally available in the usual business or engineering office, such photographic procedure, moreover, being a relatively inconvenient and time consuming process.

An important object of the present invention is to provide for the rapid and inexpensive production of enlarged prints from microfilm transparencies by means of improved apparatus making feasible the projection of printing of picture images of microfilm transparencies upon sensitized material, such as diazo material, of the sort commonly used in making contact print reproductions of engineering drawings and the like, the necessary processing of such material being quick, convenient and easily accomplished by unskilled personnel under normal office lighting conditions, since sensitized material of the character described is relatively insensitive to visible light.

Diazo sensitized material, however, because of its low photosensitivity, requires an extremely intense light source for exposure, a further requirement being substantially uniform illumination throughout the exposed area, since the material has high contrast characteristics, small differences in exposure intensity producing large differences in image density. Such characteristics make material of the sort mentioned exceedingly well suited for use in making contact prints; but the requirements for successful exposure, namely, high light source intensity, an efficient optical system, and uniformity of illumination throughout a large exposure area, are not found in combination in conventional projection equipment, and are difficult to attain, particularly where sharp image definition is also a prime requirement.

An important object of the present invention, therefore, is to provide image projection apparatus affording the foregoing desirable characteristics, to thereby render possible the use of blueprint, diazotype and like materials in the projection print reproducing equipment.

Another important object is to provide projection printing apparatus including the combination, with a lamp and reflector forming a light source, an objective lens and a condenser imaged at the objective lens, of means for accomplishing the rotation or oscillation of the light source, in order to eliminate shadows cast by portions of the lamp or its supporting members.

Another important object is to provide projection apparatus including the combination, with a lamp and reflector forming a light source, an objective lens and a condenser imaged at the objective lens, of a small condensing lens disposed in front of the lamp in position to concentrate light in the cone of lamp shadow formed in the field of reflected light rays applied upon the objective lens, to thereby produce light intensity centrally in the field substantiallyl equal to light delivered peripherally in the field.

Another important object is to control the intensity of light, delivered by a lamp and a cooperating reflector, by means of small spherically curved reflecting elements, disposed in front of the lamp, in position facing marginal portions of the reflector, so as to screen the objective against the reception of certain reflected rays, while augmenting the light applied on the objective lens from marginal portions of said reflector; a further object being to dispose the reflecting elements in position to increase the illumination delivered in the peripheral regions of the field while reducing light applied in the illuminated field inwardly of said peripheral portions.

The foregoing and numerous import objects, advantages, and inherent functions of the invention will become apparent as the same is more fully understood from the following description, which, taken in connection with the accompanying drawings, discloses a preferred embodiment of the invention.

Referring to the drawings.

Figure 1:
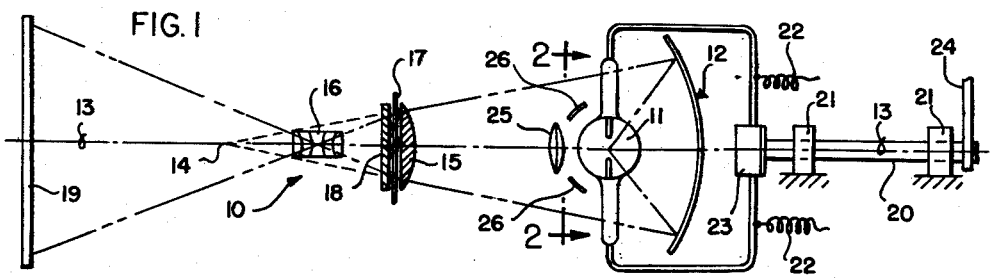
FIG. 1 is a diagrammatical showing of an optical system for projecting printing of enlarged microfilm images.
Figure 2:
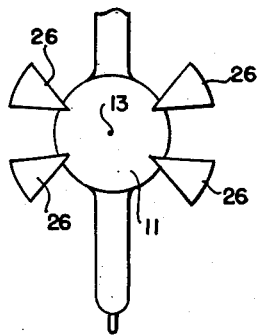
FIG. 2 is a view taken substantially along the line 2—2 in FIG. 1.
Figure 3:
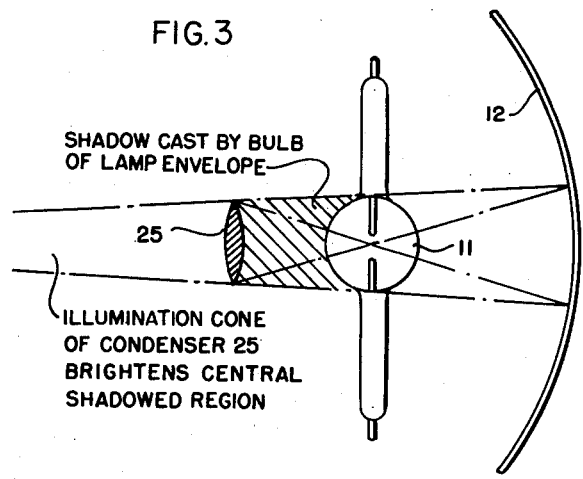
FIGS. 3 and 4 are enlarged views of a portion of the apparatus shown in FIG. 1 for the purpose of demonstrating the present invention.

To illustrate the invention, the drawings show an optical system 10 for the projection printing of filmed images, said system embodying a lamp 11 forming a source of high intensity illumination, said lamp preferably comprising a high pressure concentrated arc mercury vapor lamp of the sort commonly referred to as a short arc lamp. Behind the lamp is located a concave reflector 12 of any suitable or preferred construction, the reflecting surface of which is preferably formed as an ellipsoid of revolution having an axis of symmetry which coincides with the axis 13—13 of the optical system 10, the lamp 11 being located at one of the foci of the ellipsoidal reflector 12. In the absence of obstructions, the arc of the lamp would be imaged at the other focal point 14 of the reflector. A plano-convex condensing lens 15, however, may be employed to increase the convergence of the light rays, thereby causing the image of the lamp arc to fall within an objective lens 16. A microfilm transparency 17, bearing the image to be enlarged for projection printing, may be pressed and hence held by and between the flat surface of the condensing lens 15 and a cover plate 18 of glass or other suitable transparent material. An enlarged image of the transparency 17, accordingly, may be projected by and through the objective lens 16 and applied upon a sheet of light sensitive material 19, such as diazo sensitized sheet material or similar reproduction material, supported by any suitable, preferred or conventional means in position to receive the projected image.

The optical system comprising the lamp 11, reflector 12, condenser 15, objective lens 16 and cover plate 18, may comprise conventional components and may be conventionally mounted in operative position in any suitable, convenient or preferred supporting means. The arrangement shown, however, is not conventional, since the image of the light source, where a reflector type of condenser is used, is normally focused at or near the object, that is to say, the station at which the microfilm transparency 17 is supported, rather than at the objective lens as shown in FIG. 1.

Where a reflector is employed to apply lamp emitted light in the manner shown through lenses 15 and 16 and upon light sensitive material 19 suported at a printing station, the lamp, especially the opposite ends of a mercury vapor lamp, as well as any lamp supporting structure extending in front of the reflector, will obstruct light passing from the reflector through the transparency 17 and will cast unwanted shadows upon the light sensitive print reproduction sheet 19. The envelope of the lamp itself, although transparent, may also absorb, scatter or bend light rays so as to create a dark area centrally of the projected image. Moreover, progressive darkening of the lamp envelope, during use, is a normal occurrence which increases the shadow casting effect in the medial portions of the projection field. Furthermore, as is usual in optical systems of the character described, the intensity of illumination tends to be lower in the corners of the field than in a circular zone inwardly of said corners.

The lamp 11 may be suitably mounted upon a shaft 20 extending in line with the axis 13—13 of the optical system. The lamp carrying shaft is preferably disposed behind the reflector 12 and carried in bearings 21, so that the lamp may be rotated. Suitable electrical conducting leads 22 of flexible character may be provided for the delivery of electrical energy to the lamp 11 for the operation of the same. If desirable or necessary, contact brushes may be provided for electrically connecting the conductors 22 with lamp energizing leads supported on the lamp carrying frame. As shown, the lamp carrying frame may comprise supporting arms formed as electrical conductors mounted on the shaft and insulated therefrom, as by means of a block 23 of insulating material. The reflector 12 may be mounted on the lamp supporting frame, although it is preferable to mount the reflector on a stationary support structure.

As a consequence of the foregoing arrangement, the lamp 11 and reflector may be rocked or oscillated back and forth or rotated slowly, either by hand action applied through a handle 24 formed on the shaft, or by an electric motor drivingly connected with the shaft in any suitable, preferred or convenient manner. The effect of such lamp oscillation or rotation is to spread and hence eliminate shadows cast by the lamp ends and by lamp supporting members, so that such shadows are not perceptible in the projection print. The rate of the oscillation or rotation is not at all critical, but at least one half cycle of oscillation or one half rotation preferably should be made during an exposure interval. As a matter of convenience, the apparatus may be adjusted to provide at least one rotation or one complete oscillation cycle during the shortest exposure interval contemplated, the selected rate of lamp movement being maintained for all exposure intervals.

Lamp oscillation or rotation effectively eliminates all shadows cast by the lamp ends and lamp supports, but does not effect the shadow cast centrally by the screening effect of the lamp envelope. Depending upon the proportion or dimensions of the optical system, the lamp envelope may or may not cast a central shadow in the illumination field. In a projection system embodying a reflector, the central portions of the illumination field inherently tend to be brighter than the peripheral portion thereof; and, in some cases, depending upon the optical geometry of the system, there may be no central shadow cast at all. In systems where it exists, however, the undesirable effect of the central shadow may be offset or nullified by mounting a small condensing lens 25 in front of the lamp, such lens being sized to subtend the same angle, at the objective lens, as is subtended by the bulb of the lamp envelope. The lens 25 is proportioned so as to form an image of the light source, at the objective lens, of the same size as that produced by the reflector 12. The lens 25 may be supported in position in any suitable or preferred fashion, as by means of a lens supporting structure of conventional character. It has been found that the lens 25 may not only offset the central shadow effect entirely, but may also produce a bright central spot, in which case the lens may be reduced in size to provide central field light intensity equal to the intensity of light in the surrounding areas of the field, or the light transmitted by the lens 25 may be reduced by other means, such as by opaquing a part of its surface.

In order to increase the level of illumination at the corners of the projection field, a set of four small reflecting elements 26 of concave spherical configuration and preferably of triangular shape may be mounted on suitable supports, in position disposed in front of the lamp 11, with the spherical reflecting surfaces of the elements 26 centered on the lamp and facing toward the peripheral portions of the reflector 12. These four mirror elements 26 serve to reflect lamp emitted light back through the arc which is at the center of spherical curvature of the elements 26, and thus intensify the illumination applied by the reflector 12 in the corners of the rectangular projection field. The reflecting elements 26 also are disposed in position so that the shadows thereof formed by light reflected from the mirror 12 falls in the relatively brightly illuminated field zone which extends between the central shadow zone and the corner portions of the field of reduced brightness.

As a consequence, the reflector elements 26 not only serve to add illumination in the corner portions of the projection field, but also serve to reduce illumination slightly in the intermediate zone where illumination tends to be excessive. Since the mirror elements 26 subtend a larger angle when acting as reflectors than they do when acting as screens in the rays reflected from the mirror 12, they add much more light to the under-illuminated corner portions of the projection field than they subtract from the relatively brighter region immediately surrounding the central shadow zone.

Figure 4:
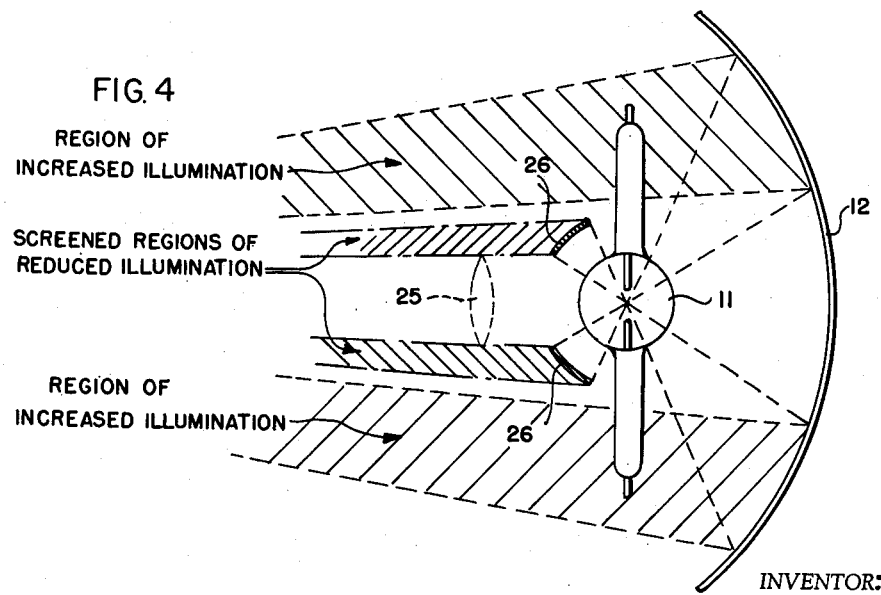

The mirror elements 26, as well as the lens 25 if desired, are preferably attached to the lamp supports and hence may oscillate or rotate with the lamp about the optical axis 13—13 of the system. As a consequence, the mirror elements cast no visible shadows in the projection field. They are made triangular in shape with the apices thereof pointing toward the axis 13—13 so that there is no abrupt change in illumination as a function of field radius, either as a result of the shadow formed or the light reflected by the elements. The broad base of these reflector elements affords maximum light reflection to the extreme corners of the field where it is most needed. The light reflecting and screening effects produced by the elements 26 are diagrammatically illustrated in FIG. 4 of the drawings, in which lamp emitted light is assumed to originate from a point source. The finite size of actual light sources causes a spreading and softening of shadows and light areas which cause them to blend together to a considerable extent. The resulting effects produced by rotation or oscillation of the lamp and by the small condenser 25, as well as by the reflecting elements 26, produces an exceptionally uniformly illuminated projection field in an exceedingly efficient optical system.

While a large condensing lens 15 which converges the light beam upon the objective lens while supporting the transparency 17 on one side has been shown, it should be understood that this condensing lens is not at all essential to the realization of the benefits of the present invention. In its place a larger reflector could be used in place of the reflector 12 in order to focus lamp emitted light upon the objective lens without utilizing a condensing lens in the system. In such case, a pair of flat transparent panels could be employed to support the microfilm element 17; or means may be provided for supporting the element 17 at its edges only, to thereby avoid absorption and scattering of light by the transparent film holding panel.

It is thought that the invention and its many attendant advantages will be understood from the foregoing description, and it is obvious that numerous changes may be made in the form, construction and arrangement of the several parts without departing from the spirit or scope of the invention or sacrificing any of its attendant advantages, the form herein described being a preferred embodiment for the purpose of demonstrating the invention.

The invention is hereby claimed as follows:

1. In a system for projecting light in an illuminated field embodying a lamp forming a light source and having a support leg defining the axis of the lamp, a concave reflector disposed behind the lamp in position to reflect a beam of light into the illuminated field along an axis through said source and normal to the axis of the lamp, the lamp and reflector being sized so that the reflected beam carries the shadow of substantial portions of the support leg, the combination of means to support the lamp for turning movement about the axis of the beam to thereby continuously shift, in the illuminated field, the shadows formed by the support leg in the beam of light delivered by the reflector.

2. In a system as set forth in claim 1, wherein the lamp embodies a globular envelope portion enclosing the light source, and a condensing lens supported in front of said lamp in position to apply a beam of light in the zone of shadow formed by the globular portion of the lamp envelope centrally in the light beam transmitted by said reflector into the illuminated field.

3. In a system as set forth in claim 1, including a projection lens and a condenser for applying the beam of light from the lamp and reflector upon said lens for transmission thence in the illuminated field, the combination of means for supporting a picture element in position for projection in said beam.

4. In a projection system embodying a lamp forming a light source and a cooperating concave reflector for projecting a light beam in an illuminated field, the combination of a plurality of small spaced reflection elements having spherical curvature centered on the light source and mounted in position to reflect lamp emitted light through said source and upon peripheral portions of the reflector in order to augment source emitted light reflected from said peripheral reflector portions into corresponding portions of the illuminated field.

5. In a projection system as set forth in claim 4, wherein the reflection elements are of triangular configuration and are mounted in position with the apices thereof extending radially inwardly toward the axis of said light beam.

6. In a projection system as set forth in claim 4, wherein the illuminated field is of rectangular configuration, the reflection elements being disposed in position to reflect lamp emitted light upon spaced apart peripheral portions of the reflector for delivery thence into the four corners of the rectangular field.

7. In a projection system as set forth in claim 4 wherein the reflection elements are disposed in position to screen from the illuminated field some of the light delivered therein by said reflector in small zones located intermediate the central and marginal portions of the field.

8. In a projection system as set forth in claim 4 wherein the lamp embodies a globular envelope portion enclosing the light source, and a condensing lens supported in front of said lamp in position to apply a beam of light in the zone of shadow formed by the globular portion of the lamp envelope centrally of the light beam transmitted by the reflector into the illuminated field, the small reflection elements being disposed in position to screen from the illuminated field some of the light delivered from the reflector outwardly of the central zone of shadow.

9. In an image projecting system embodying a lamp and cooperating concave reflector, a projection lens and a condenser for applying a beam of light from the lamp and reflector on said lens for transmission thence in an illuminated projection field, the combination of means for supporting a picture element in position for projection in said beam, a condensing lens supported in front of said lamp in position to apply a beam of light in the zone of shadow formed by the lamp envelope centrally in the light beam transmitted by said reflector into the illuminated field, a plurality of reflection elements mounted in position to reflect lamp emitted light upon peripheral portions of the reflector in order to augment light reflected from said peripheral reflector portions into the illuminated field, and means to support said lamp for turning movement about an axis extending in the direction of projection of said light beam in order to continuously shift, in said illuminated field, shadows formed by the supported lamp in the light beam delivered by said reflector.

10. In an image projecting system embodying a lamp and cooperating concave reflector, a projection lens and a condenser for applying a beam of light from the lamp and reflector on said lens for transmission thence in an illuminated projection field, the combination of means for supporting a picture element in position for projection in said beam, and a set of four rectangularly disposed triangular reflection elements of concave configuration mounted in position concentric with said lamp with the apices of the elements extending radially inwardly toward the axis of said system, said elements being mounted in position to screen from said field some of the light delivered from said reflector toward said lens in a zone outwardly of the central portions of said field, said elements being adapted also to reflect lamp emitted light upon the peripheral portions of said reflector in order to augment light reflected toward said lens from said peripheral reflector portions into the four corners of the rectangular illuminated field outwardly of said zone.

References Cited in the file of this patent

UNITED STATES PATENTS

| | | |
|---|---|---|
| 1,248,456 | Clark | Dec. 4, 1917 |
| 1,586,670 | Girard | June 1, 1926 |
| 1,828,971 | Isbills | Oct. 27, 1931 |
| 1,943,511 | Bauersfeld | Jan. 16, 1934 |
| 1,973,454 | Wilfred | Sept. 11, 1934 |
| 1,989,336 | Pollard | Jan. 29, 1935 |
| 2,117,737 | May | May 17, 1938 |
| 2,815,696 | Brownscombe | Dec. 10, 1957 |
| 2,817,997 | Ulffers | Dec. 31, 1957 |

FOREIGN PATENTS

| | | |
|---|---|---|
| 327,025 | Germany | Oct. 6, 1920 |
| 454,777 | Great Britain | Oct. 7, 1936 |
| 784,063 | France | Apr. 23, 1935 |

OTHER REFERENCES

"Photometers and Accessories," 1940, by Leeds & Northrop Co., Philadelphia, Pa., catalogue E-72 (pages 5, 6 and 7 relied on).